United States Patent
Semar et al.

(10) Patent No.: US 10,694,742 B2
(45) Date of Patent: Jun. 30, 2020

(54) COMPOSITION COMPRISING A PESTICIDE AND A HYDROXYALKYL POLYOXYLENE GLYCOL ETHER

(71) Applicant: BASF SE, Ludwigshafen (DE)

(72) Inventors: Martin Semar, Gleiszellen-Gleishorbach (DE); Ingo Fleute-Schlachter, Essen (DE); Hans-Christian Raths, Monheim (DE); Markus Kalt, Waldsee (DE); Rainer Berghaus, Speyer (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/308,118

(22) PCT Filed: May 4, 2015

(86) PCT No.: PCT/EP2015/059636
§ 371 (c)(1),
(2) Date: Nov. 1, 2016

(87) PCT Pub. No.: WO2015/169711
PCT Pub. Date: Nov. 12, 2015

(65) Prior Publication Data
US 2017/0099834 A1 Apr. 13, 2017
US 2018/0064104 A9 Mar. 8, 2018

(30) Foreign Application Priority Data

May 6, 2014 (EP) .................... 14167190
May 6, 2014 (EP) .................... 14167194

(51) Int. Cl.
*A01N 25/30* (2006.01)
*A01N 43/56* (2006.01)
*A01N 43/653* (2006.01)

(52) U.S. Cl.
CPC ............. *A01N 25/30* (2013.01); *A01N 43/56* (2013.01); *A01N 43/653* (2013.01)

(58) Field of Classification Search
CPC ....... A01N 25/30; A01N 43/653; A01N 43/56
See application file for complete search history.

(56) References Cited

U.S. PATENT DOCUMENTS

| | | | |
|---|---|---|---|
| 2010/0184603 A1 | 7/2010 | Stoesser et al. | |
| 2011/0039904 A1 | 2/2011 | Steinbrenner et al. | |
| 2013/0040874 A1 | 2/2013 | Raths et al. | |
| 2013/0267476 A1* | 10/2013 | Defieber | A01N 43/56 514/30 |

FOREIGN PATENT DOCUMENTS

| | | |
|---|---|---|
| EP | 2 383 247 A1 | 11/2011 |
| JP | S54 49322 A | 4/1979 |
| WO | 2006035316 A2 | 4/2006 |
| WO | 2008132150 A1 | 11/2008 |
| WO | 2009130281 A1 | 10/2009 |
| WO | WO 2011/134556 * | 11/2011 |

OTHER PUBLICATIONS

Raths et al. WO 2011/134556; published: Nov. 3, 2011; English machine translation obtained on Dec. 20, 2017.*
FRAC, FRAC Code List 2018: Fungicides sorted by mode of action, 2018. (Year: 2018).*
International Search Report for PCT/EP2015/059636, dated Jul. 6, 2015. 3 pages.
Adjuvant Certification Program, Council of Producers and Distributors of Agrotechnology, downloaded Nov. 1, 2018 at https://cpda.com/adjuvant-certified.program, 2 pages.

* cited by examiner

*Primary Examiner* — Johann R Richter
*Assistant Examiner* — Genevieve S Alley
(74) *Attorney, Agent, or Firm* — Armstrong Teasdale LLP

(57) ABSTRACT

A composition having a pesticide and a hydroxyalkyl polyoxylene glycol ether of the general formula (I)

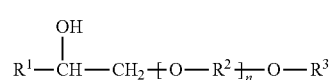

where $R^1$ is a saturated or unsaturated, linear or branched alkyl having 6 to 18 carbon atoms;

$R^2$ is ethylene, propylene, butylene or a mixture thereof;

$R^3$ is a saturated or unsaturated, linear or branched alkyl having 6 to 18 carbon atoms;

and n has a value of from 1 to 100. The composition may be used as an adjuvant in in pesticide-comprising spray mixtures. In a method for controlling phytopathogenic fungi and/or undesirable plant growth and/or undesirable insect or mite infestation and/or for regulating the growth of plants, the composition is allowed to act on the respective pests, the habitat thereof or the plants to be protected from the respective pest, on the soil and/or on undesirable plants and/or the crop plants and/or the habitat thereof. Seed may also include the composition.

20 Claims, No Drawings

COMPOSITION COMPRISING A PESTICIDE AND A HYDROXYALKYL POLYOXYLENE GLYCOL ETHER

CROSS-REFERENCE TO RELATED APPLICATIONS

This application is a U.S. National Phase Application of PCT/EP2015/059636, filed May 4, 2015, which is incorporated herein by reference in its entirety.

The present invention relates to a composition comprising a pesticide and hydroxyalkyl polyoxylene glycol ether of the formula (I). The invention further relates to use of hydroxyalkyl polyoxylene glycol ether as adjuvants in pesticide-comprising spray mixtures. The invention further relates to a method for controlling phytopathogenic fungi and/or undesirable plant growth and/or undesirable insect or mite infestation and/or for regulating the growth of plants, wherein the composition is allowed to act on the respective pests, the habitat thereof or the plants to be protected from the respective pest, on the soil and/or on undesirable plants and/or the crop plants and/or the habitat thereof. Furthermore, the invention relates to seed comprising the composition.

The present invention comprises combinations of preferred features with other preferred features.

It is generally known and agricultural practice to add certain adjuvants to formulations in order to improve the activity of the latter. Advantageously, this allows reduced amounts of active ingredient in the formulation while maintaining the same activity, thereby being able to minimize cost and, if appropriate, operating within existing legislation. In individual cases, this also allows the spectrum of the active ingredient to be widened, since plants whose treatment with a specific active ingredient without addition was only possible to an unsatisfactory extent, are now capable of being subjected to such a treatment as the result of the addition of certain auxiliaries.

Furthermore, the performance under adverse environmental conditions may be increased in individual cases by a suitable formulation. Of course, incompatibilities of various active ingredients in one formulation can also be avoided. Such auxiliaries are sometimes also referred to as adjuvants. Frequently, they take the form of surface-active or salt-like compounds.

As regards the uptake of the active ingredient into the leaf, surface-active substances may act as modifiers and adjuvants. In general, it is assumed that suitable surface-active substances are capable of increasing the effective contact area of fluids on leaves by providing better wetting. Moreover, certain surface-active substances act as plasticizer, i.e. are capable of changing the epicuticular waxy layer from a crystalline to an amorphous state, which facilitates the sorption of the active ingredient. Furthermore, some surface-active substances are also capable of improving the solubility of active ingredients in formulations, thereby avoiding, or at least delaying, crystal formation. Finally, in certain cases they can also influence the absorption of active ingredients by retaining moisture.

Synthetic surface-active substances which have usually been used as adjuvants drawing upon, inter alia, polyoxyethylene condensates with alcohols, alkylphenols or alkylamines with HLB values in the range of from 8 to 13. In this regard, the document WO 00/42847 mentions for example the use of certain linear alcohol alkoxylates in order to increase the activity of agrochemical biocide formulations.

It is in particular the structure of the alcohol moiety and in certain cases also of the alkoxylate moiety and its terminal group which influences the properties of the surfactants leading to a variety of technical effects showing usefulness in these applications. These include wetting, spreading, penetration, adhesion, film formation, the improvement of compatibilities, drift control, and defoaming.

WO 03/090531 describes the use of alkoxylates of certain branched alcohols as adjuvant for the agrochemical sector. Similar alcohol alkoxylates are proposed in WO 2005/015998 specifically as adjuvant for fungicidal benzamide oxime derivatives. WO 00/35278 relates to agrochemical formulations based on PO/EO block copolymers of 2-ethylhexanol. WO 2005/084435 describes oil based suspension concentrates which comprise one of the two end group-capped alcohol block alkoxylates as penetrant. Also WO 08/132150 and WO 09/130281 described certain alcohol alkoxylates having adjuvant activity. WO 03/022048 describes inter alia as adjuvant $C_1$-$C_7$ alkyl capped oleyl alcohol ethoxylates whereby the production of such compounds is rather critical due to the use of alkyl chloride.

The present invention is based on the object of providing further adjuvants which are useful in the agrochemical sector.

The object was solved by a composition comprising a pesticide and a hydroxyalkyl polyoxylene glycol ether of the general formula (I)

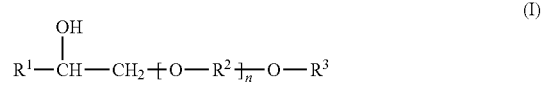

(I)

where
$R^1$ is a saturated or unsaturated, linear or branched alkyl having 6 to 18 carbon atoms;
$R^2$ is ethylene, propylene, butylene or a mixture thereof;
$R^3$ is a saturated or unsaturated, linear or branched alkyl having 6 to 18 carbon atoms; and
n is has a value of from 1 to 100.

$R^1$ is a preferably saturated or unsaturated, linear or branched alkyl having 8 to 14 carbon atoms, especially preferably a saturated linear alkyl having 8 to 14 carbon atoms. In a specifically preferred embodiment, $R^1$ is a saturated linear alkyl having 8 to 12 carbon atoms. In a further specifically preferred embodiment, $R^1$ is saturated linear alkyl having 8 or 10 carbon atoms.

$R^2$ is preferably ethylene, propylene or butylene or a mixture thereof. In this context, for example $R^2$ may comprise a mixture of these groups. Such mixtures can be linked to one another in any desired order, for example randomly or blockwise (such as one block ethylene and one block propylene). In a preferred embodiment, $R^2$ is ethylene or a mixture of ethylene and propylene. In another preferred embodiment, $R^2$ is ethylene.

If $R^2$ comprises a butylene radical, the latter may be present as a n-butylene, an isobutylene or a 2,3-butylene group, with n-butylene and isobutylene being preferred and n-butylene being most preferred.

$R^3$ is preferably a saturated or unsaturated, branched alkyl having 8 to 12 carbon atoms, it is especially preferably $R^3$ is a saturated branched alkyl having 8 to 12 carbon atoms. In another form $R^3$ is preferably a saturated or unsaturated, linear or branched alkyl having 8 to 16 carbon atoms, it is especially preferably $R^3$ is a saturated linear or branched alkyl having 8 to 14 carbon atoms. In a further specifically preferred embodiment, $R^3$ is an isodecyl, 2-propylheptyl or 2-ethylhexyl. In another preferred embodiment, $R^3$ is a saturated linear alkyl having 8 to 10 carbon atoms.

Preferably, n has a value of from 3 to 50, especially preferably from 5 to 40. The value of n is normally an average value as it mostly depends upon the alkoxylation with oxirane derivatives. Therefore, n can not only be an integer, but also all values between the integers.

In another form the hydroxyalkyl polyoxylene glycol ether is of the general formula (II)

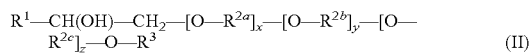  (II)

where $R^1$ is a saturated or unsaturated, linear or branched alkyl having 6 to 18 carbon atoms;

$R^{2a}$, $R^{2b}$ and $R^{2c}$ are independently ethylene, propylene, or butylene;

$R^3$ is a saturated or unsaturated, linear or branched alkyl having 6 to 18 carbon atoms;

x, y and z are independently a value from 0 to 100 and x, y and z sum up to a value of from 1 to 100.

$R^{2a}$, $R^{2b}$ and $R^{2c}$ are independently ethylene, propylene, or butylene. In a preferred embodiment, $R^{2a}$, $R^{2b}$ and $R^{2c}$ are independently ethylene or propylene.

Preferably, x, y and z are independently a value of from 0 to 50, especially preferably from 0 to 40. The value of x, y and z are normally an average value as it mostly depends upon the alkoxylation with oxirane derivatives. Therefore, x, y and z can not only be an integer, but also all values between the integers.

Preferably, x, y and z sum up to a value of from 3 to 50, especially preferably from 5 to 40. The value of the sum of x, y and z is normally an average value as it mostly depends upon the alkoxylation with oxirane derivatives. Therefore, this value can not only be an integer, but also all values between the integers.

In one form $R^1$ is a saturated or unsaturated, linear or branched alkyl having 6 to 18 carbon atoms, $R^3$ is a saturated or unsaturated, linear or branched alkyl having 6 to 18 carbon atoms, $R^{2a}$ is ethylene, x is from 1 to 50, $R^{2b}$ is propylene, y is from 1 to 50, $R^{2c}$ is ethylene or propylene, z is from 0 to 50, and x, y and z sum up to a value of from 2 to 100.

In a preferred form $R^1$ is a saturated or unsaturated, linear or branched alkyl having 6 to 16 carbon atoms, $R^3$ is a saturated or unsaturated, linear or branched alkyl having 6 to 18 carbon atoms, $R^{2a}$ is ethylene, x is from 1 to 25, $R^{2b}$ is propylene, y is from 1 to 25, $R^{2c}$ is ethylene or propylene, z is from 0 to 20, and x, y and z sum up to a value of from 2 to 50.

In another form $R^1$ is a saturated or unsaturated, linear or branched alkyl having 6 to 18 carbon atoms, $R^3$ is a saturated or unsaturated, linear or branched alkyl having 6 to 18 carbon atoms, $R^{2a}$ is propylene, x is from 1 to 50, $R^{2b}$ is ethylene, y is from 1 to 50, $R^{2c}$ is ethylene or propylene, z is from 0 to 50 (wherein z is preferably 0), and x, y and z sum up to a value of from 2 to 100.

In another preferred form $R^1$ is a saturated or unsaturated, linear or branched alkyl having 6 to 16 carbon atoms, $R^3$ is a saturated or unsaturated, linear or branched alkyl having 6 to 18 carbon atoms, $R^{2a}$ is propylene, x is from 1 to 25, $R^{2b}$ is ethylene, y is from 1 to 25, $R^{2c}$ is ethylene or propylene, z is from 0 to 20 (wherein z is preferably 0), and x, y and z sum up to a value of from 2 to 50.

In another form $R^1$ is a saturated or unsaturated, linear or branched alkyl having 6 to 18 carbon atoms, $R^3$ is a saturated or unsaturated, linear or branched alkyl having 6 to 18 carbon atoms, $R^{2a}$ is ethylene, x is from 1 to 50, and y and z are 0.

In another preferred form $R^1$ is a saturated or unsaturated, linear or branched alkyl having 6 to 18 carbon atoms, $R^3$ is a saturated or unsaturated, linear or branched alkyl having 6 to 16 carbon atoms, $R^{2a}$ is ethylene, x is from 1 to 20, and y and z are 0.

In most cases, the composition according to the invention comprises from 0.1 to 50% by weight of the hydroxyalkyl polyoxylene glycol ether as defined above, preferably from 1 to 25% by weight and in particular from 3 to 15% by weight.

The term pesticide refers to at least one active substance selected from the group of the fungicides, insecticides, nematicides, herbicides, safeners, molluscicides, rodenticides and/or growth regulators. Preferred pesticides are fungicides, insecticides, herbicides and growth regulators. Especially preferred pesticides are fungicides. Mixtures of pesticides from two or more of the abovementioned classes may also be used. The skilled person is familiar with such pesticides, which can be found, for example, in Pesticide Manual, 16th Ed. (2013), The British Crop Protection Council, London. The above disclosed pesticides can be combined with any hydroxyalkyl polyoxylene glycol ether of the present invention. Suitable insecticides are insecticides from the class of the carbamates, organophosphates, organochlorine insecticides, phenylpyrazoles, pyrethroids, neonicotinoids, spinosins, avermectins, milbemycins, juvenile hormone analogs, alkyl halides, organotin compounds nereistoxin analogs, benzoylureas, diacylhydrazines, METI acarizides, and insecticides such as chloropicrin, pymetrozin, flonicamid, clofentezin, hexythiazox, etoxazole, diafenthiuron, propargite, tetradifon, chlorfenapyr, DNOC, buprofezine, cyromazine, amitraz, hydramethylnon, acequinocyl, fluacrypyrim, rotenone, or their derivatives. Suitable fungicides are fungicides from the classes of dinitroanilines, allylamines, anilinopyrimidines, antibiotics, aromatic hydrocarbons, benzenesulfonamides, benzimidazoles, benzisothiazoles, benzophenones, benzothiadiazoles, benzotriazines, benzyl carbamates, carbamates, carboxamides, carboxylic acid diamides, chloronitriles cyanoacetamide oximes, cyanoimidazoles, cyclopropanecarboxamides, dicarboximides, dihydrodioxazines, dinitrophenyl crotonates, dithiocarbamates, dithiolanes, ethylphosphonates, ethylaminothiazolecarboxamides, guanidines, hydroxy-(2-amino)pyrimidines, hydroxyanilides, imidazoles, imidazolinones, inorganic substances, isobenzofuranones, methoxyacrylates, methoxycarbamates, morpholines, N phenylcarbamates, oxazolidinediones, oximinoacetates, oximinoacetamides, peptidylpyrimidine nucleosides, phenylacetamides, phenylamides, phenylpyrroles, phenylureas, phosphonates, phosphorothiolates, phthalamic acids, phthalimides, piperazines, piperidines, propionamides, pyridazinones, pyridines, pyridinylmethylbenzamides, pyrimidinamines, pyrimidines, pyrimidinonehydrazones, pyrroloquinolinones, quinazolinones, quinolines, quinones, sulfamides, sulfamoyltriazoles, thiazolecarboxamides, thiocarbamates, thiophanates, thiophenecarboxamides, toluamides, triphenyltin compounds, triazines, triazoles. Suitable herbicides are herbicides from the classes of the acetamides, amides, aryloxyphenoxypropionates, benzamides, benzofuran, benzoic acids, benzothiadiazinones, bipyridylium, carbamates, chloroacetamides, chlorocarboxylic acids, cyclohexanediones, dinitroanilines, dinitrophenol, diphenyl ether, glycines, imidazolinones, isoxazoles, isoxazolidinones, nitriles, N-phenylphthalimides, oxadiazoles, oxazolidinediones, oxyacetamides, phenoxycarboxylic acids, phenylcarbamates, phenylpyrazoles, phenylpyrazolines, phenylpyridazines, phosphinic acids, phosphoroamidates, phosphorodithioates, phthalamates, pyrazoles, pyridazinones, pyridines, pyridinecarboxylic acids, pyridinecarboxamides, pyrimidinediones, pyrimidinyl(thio)benzoates, quinolinecarboxylic acids, semicarbazones, sulfonylaminocarbonyltriazolinones, sulfonylureas, tetrazolinones, thiadiazoles, thiocarbamates, triazines, triazinones, triazoles, triazolinones, triazolocarboxamides, triazolopyrimidines, triketones, uracils, ureas.

The pesticide has preferably a solubility in water of less than 10 g/l at 20° C., more preferably of less than 1, g/l, even more preferably of less than 0.5 g/l and most preferably of less than 0.1 g/l.

Preferred pesticides of the compositions of the present invention comprise at least one fungicide selected from carboxamides, azoles, strobilurins, phenylamides, phenylpyrrole, morpholines, spiro ketalamines and dithiocarbamates. Particularly preferred are fungicides selected from pyrazole-4-carboxamides, pyridinyl-ethyl benzamides, phenyl benzamides, triazoles and strobilurins. In a more preferred embodiment, the fungicides are selected from boscalid, epoxiconazole, fluxapyroxad and dimoxystrobin.

Especially preferably, the pesticide of the compositions of the present invention comprises at least one fungicide and a further pesticide (such as at least one herbicide, insecticide, and/or safener, with herbicides being preferred).

The compositions according to the invention can furthermore be converted into customary types of agrochemical compositions, e. g. solutions, emulsions, suspensions, dusts, powders, pastes, granules, pressings, capsules, and mixtures thereof. Examples for composition types are suspensions (e.g. SC, OD, FS), emulsifiable concentrates (e.g. EC), emulsions (e.g. EW, EO, ES, ME), capsules (e.g. CS, ZC), pastes, pastilles, wettable powders or dusts (e.g. WP, SP, WS, DP, DS), pressings (e.g. BR, TB, DT), granules (e.g. WG, SG, GR, FG, GG, MG), insecticidal articles (e.g. LN), as well as gel formulations for the treatment of plant propagation materials such as seeds (e.g. GF). These and further compositions types are defined in the "Catalogue of pesticide formulation types and international coding system", Technical Monograph No. 2, 6$^{th}$ Ed. May 2008, CropLife International.

The compositions are prepared in a known manner, such as described by Mollet and Grubemann, Formulation technology, Wiley VCH, Weinheim, 2001; or Knowles, New developments in crop protection product formulation, Agrow Reports DS243, T&F Informa, London, 2005.

Examples for suitable auxiliaries are solvents, liquid carriers, solid carriers or fillers, surfactants, dispersants, emulsifiers, wetters, adjuvants, solubilizers, penetration enhancers, protective colloids, adhesion agents, thickeners, humectants, repellents, attractants, feeding stimulants, compatibilizers, bactericides, anti-freezing agents, anti-foaming agents, colorants, tackifiers and binders.

Suitable solvents and liquid carriers are water and organic solvents, such as mineral oil fractions of medium to high boiling point, e.g. kerosene, diesel oil; oils of vegetable or animal origin; aliphatic, cyclic and aromatic hydrocarbons, e. g. toluene, paraffin, tetrahydronaphthalene, alkylated naphthalenes; alcohols, e.g. ethanol, propanol, butanol, benzylalcohol, cyclohexanol; glycols; DMSO; ketones, e.g. cyclohexanone; esters, e.g. lactates, carbonates, fatty acid esters, gamma-butyrolactone; fatty acids; phosphonates; amines; amides, e.g. N-methylpyrrolidone, fatty acid dimethylamides, dimethyllactamides; and mixtures thereof.

Suitable solid carriers or fillers are mineral earths, e.g. silicates, silica gels, talc, kaolins, limestone, lime, chalk, clays, dolomite, diatomaceous earth, bentonite, calcium sulfate, magnesium sulfate, magnesium oxide; polysaccharide powders, e.g. cellulose, starch; fertilizers, e.g. ammonium sulfate, ammonium phosphate, ammonium nitrate, ureas; products of vegetable origin, e.g. cereal meal, tree bark meal, wood meal, nutshell meal, and mixtures thereof.

Suitable surfactants are surface-active compounds, such as anionic, cationic, nonionic and amphoteric surfactants, block polymers, polyelectrolytes, and mixtures thereof. Such surfactants can be used as emulsifier, dispersant, solubilizer, wetter, penetration enhancer, protective colloid, or adjuvant. Examples of surfactants are listed in McCutcheon's, Vol. 1: Emulsifiers & Detergents, McCutcheon's Directories, Glen Rock, USA, 2008 (International Ed. or North American Ed.).

Suitable anionic surfactants are alkali, alkaline earth or ammonium salts of sulfonates, sulfates, phosphates, carboxylates, and mixtures thereof. Examples of sulfonates are alkylarylsulfonates, diphenylsulfonates, alpha-olefin sulfonates, lignine sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkylnaphthalenes, sulfosuccinates or sulfosuccinamates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates.

Suitable nonionic surfactants are alkoxylates, N-substituted fatty acid amides, amine oxides, esters, sugar-based surfactants, polymeric surfactants, and mixtures thereof. Examples of alkoxylates are compounds such as alcohols, alkylphenols, amines, amides, arylphenols, fatty acids or fatty acid esters which have been alkoxylated with 1 to 50 equivalents. Ethylene oxide and/or propylene oxide may be employed for the alkoxylation, preferably ethylene oxide. Examples of N-substituted fatty acid amides are fatty acid glucamides or fatty acid alkanolamides.

Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are home- or copolymers of vinylpyrrolidone, vinylalcohols, or vinylacetate.

Suitable cationic surfactants are quaternary surfactants, for example quaternary ammonium compounds with one or two hydrophobic groups, or salts of long-chain primary amines. Suitable amphoteric surfactants are alkylbetaines and imidazolines. Suitable block polymers are block polymers of the A-B or A-B-A type comprising blocks of polyethylene oxide and polypropylene oxide, or of the A-B-C type comprising alkanol, polyethylene oxide and polypropylene oxide. Suitable polyelectrolytes are polyacids or polybases. Examples of polyacids are alkali salts of polyacrylic acid or polyacid comb polymers. Examples of polybases are polyvinylamines or polyethyleneamines.

Suitable adjuvants are compounds, which have a negligible or even no pesticidal activity themselves, and which improve the biological performance of the active, i.e. pesticide on the target. Examples are surfactants, mineral or vegetable oils, and other auxiliaries. Further examples are listed by Knowles, Adjuvants and additives, Agrow Reports DS256, T&F Informa UK, 2006, chapter 5.

Suitable thickeners are polysaccharides (e.g. xanthan gum, carboxymethylcellulose), anorganic clays (organically modified or unmodified), polycarboxylates, and silicates.

Suitable bactericides are bronopol and isothiazolinone derivatives such as alkylisothiazolinones and benzisothiazolinones.

Suitable anti-freezing agents are ethylene glycol, propylene glycol, urea and glycerin.

Suitable anti-foaming agents are silicones, long chain alcohols, and salts of fatty acids.

Suitable colorants (e.g. in red, blue, or green) are pigments of low water solubility and water-soluble dyes. Examples are inorganic colorants (e.g. iron oxide, titan oxide, iron hexacyanoferrate) and organic colorants (e.g. alizarin-, azo- and phthalocyanine colorants).

Suitable tackifiers or binders are polyvinylpyrrolidons, polyvinylacetates, polyvinyl alcohols, polyacrylates, biological or synthetic waxes, and cellulose ethers.

Examples for composition types and their preparation are:

i) Water-Soluble Concentrates (SL, LS)

10-60 wt % of a pesticide according to the invention and 5-15 wt % wetting agent (e.g. alcohol alkoxylates) are dissolved in water and/or in a water-soluble solvent (e.g. alcohols) up to 100 wt %. The active substance dissolves upon dilution with water.

ii) Dispersible Concentrates (DC)

5-25 wt % of a pesticide according to the invention and 1-10 wt % dispersant (e. g. polyvinylpyrrolidone) are dissolved in up to 100 wt % organic solvent (e.g. cyclohexanone). Dilution with water gives a dispersion.

iii) Emulsifiable Concentrates (EC)

15-70 wt % of a pesticide according to the invention and 5-10 wt % emulsifiers (e.g. calcium dodecylbenzenesulfonate and castor oil ethoxylate) are dissolved in up to 100 wt % water-insoluble organic solvent (e.g. aromatic hydrocarbon). Dilution with water gives an emulsion.

iv) Emulsions (EW, EO, ES)

5-40 wt % of a pesticide according to the invention and 1-10 wt % emulsifiers (e.g. calcium dodecylbenzenesulfonate and castor oil ethoxylate) are dissolved in 20-40 wt % water-insoluble organic solvent (e.g. aromatic hydrocarbon). This mixture is introduced into up to 100 wt % water by means of an emulsifying machine and made into a homogeneous emulsion. Dilution with water gives an emulsion.

v) Suspensions (SC, OD, FS)

In an agitated ball mill, 20-60 wt % of a pesticide according to the invention are comminuted with addition of 2-10 wt % dispersants and wetting agents (e.g. sodium lignosulfonate and alcohol ethoxylate), 0.1-2 wt % thickener (e.g. xanthan gum) and up to 100 wt % water to give a fine active substance suspension. Dilution with water gives a stable suspension of the active substance. For FS type composition up to 40 wt % binder (e.g. polyvinylalcohol) is added.

vi) Water-Dispersible Granules and Water-Soluble Granules (WG, SG)

50-80 wt % of a pesticide according to the invention are ground finely with addition of up to 100 wt % dispersants and wetting agents (e.g. sodium lignosulfonate and alcohol ethoxylate) and prepared as water-dispersible or water-soluble granules by means of technical appliances (e. g. extrusion, spray tower, fluidized bed). Dilution with water gives a stable dispersion or solution of the active substance.

vii) Water-Dispersible Powders and Water-Soluble Powders (WP, SP, WS)

50-80 wt % of a pesticide according to the invention are ground in a rotor-stator mill with addition of 1-5 wt % dispersants (e.g. sodium lignosulfonate), 1-3 wt % wetting agents (e.g. alcohol ethoxylate) and up to 100 wt % solid carrier, e.g. silica gel. Dilution with water gives a stable dispersion or solution of the active substance.

viii) Gel (GW, GF)

In an agitated ball mill, 5-25 wt % of a pesticide according to the invention are comminuted with addition of 3-10 wt % dispersants (e.g. sodium lignosulfonate), 1-5 wt % thickener (e.g. carboxymethylcellulose) and up to 100 wt % water to give a fine suspension of the active substance. Dilution with water gives a stable suspension of the active substance.

ix) Microemulsion (ME)

5-20 wt % of a pesticide according to the invention are added to 5-30 wt % organic solvent blend (e.g. fatty acid dimethylamide and cyclohexanone), 10-25 wt % surfactant blend (e.g. alcohol ethoxylate and arylphenol ethoxylate), and water up to 100%. This mixture is stirred for 1 h to produce spontaneously a thermodynamically stable microemulsion.

x) Microcapsules (CS)

An oil phase comprising 5-50 wt % of a pesticide according to the invention, 0-40 wt % water insoluble organic solvent (e.g. aromatic hydrocarbon), 2-15 wt % acrylic monomers (e.g. methylmethacrylate, methacrylic acid and a di- or triacrylate) are dispersed into an aqueous solution of a protective colloid (e.g. polyvinyl alcohol). Radical polymerization initiated by a radical initiator results in the formation of poly(meth)acrylate microcapsules. Alternatively, an oil phase comprising 5-50 wt % of a pesticide according to the invention, 0-40 wt % water insoluble organic solvent (e.g. aromatic hydrocarbon), and an isocyanate monomer (e.g. diphenylmethene-4,4'-diisocyanatae) are dispersed into an aqueous solution of a protective colloid (e.g. polyvinyl alcohol). The addition of a polyamine (e.g. hexamethylenediamine) results in the formation of a polyurea microcapsules. The monomers amount to 1-10 wt %. The wt % relate to the total CS composition.

xi) Dustable Powders (DP, DS)

1-10 wt % of a pesticide according to the invention are ground finely and mixed intimately with up to 100 wt % solid carrier, e.g. finely divided kaolin.

xii) Granules (GR, FG)

0.5-30 wt % of a pesticide according to the invention is ground finely and associated with up to 100 wt % solid carrier (e.g. silicate). Granulation is achieved by extrusion, spray-drying or the fluidized bed.

xiii) Ultra-Low Volume Liquids (UL)

1-50 wt % of a pesticide according to the invention are dissolved in up to 100 wt % organic solvent, e.g. aromatic hydrocarbon.

The compositions types i) to xiii) may optionally comprise further auxiliaries, such as 0.1-1 wt % bactericides, 5-15 wt % anti-freezing agents, 0.1-1 wt % anti-foaming agents, and 0.1-1 wt % colorants.

The agrochemical compositions generally comprise between 0.01 and 95%, preferably between 0.1 and 90%, and most preferably between 0.5 and 75%, by weight of pesticide. The active substances are employed in a purity of from 90% to 100%, preferably from 95% to 100% (according to NMR spectrum).

Water-soluble concentrates (LS), Suspoemulsions (SE), flowable concentrates (FS), powders for dry treatment (DS), water-dispersible powders for slurry treatment (WS), water-soluble powders (SS), emulsions (ES), emulsifiable concentrates (EC) and gels (GF) are usually employed for the purposes of treatment of plant propagation materials, particularly seeds. The compositions in question give, after two-to-tenfold dilution, active substance concentrations of from 0.01 to 60% by weight, preferably from 0.1 to 40% by weight, in the ready-to-use preparations. Application can be carried out before or during sowing. Methods for applying or treating pesticide and compositions thereof, respectively, on to plant propagation material, especially seeds include dressing, coating, pelleting, dusting, soaking and in-furrow application methods of the propagation material. Preferably, pesticide or the compositions thereof, respectively, are applied on to the plant propagation material by a method such that germination is not induced, e. g. by seed dressing, pelleting, coating and dusting.

When employed in plant protection, the amounts of active substances applied are, depending on the kind of effect desired, from 0.001 to 2 kg per ha, preferably from 0.005 to 2 kg per ha, more preferably from 0.05 to 0.9 kg per ha, in particular from 0.1 to 0.75 kg per ha.

In treatment of plant propagation materials such as seeds, e. g. by dusting, coating or drenching seed, amounts of active substance of from 0.1 to 1000 g, preferably from 1 to 1000 g, more preferably from 1 to 100 g and most preferably from 5 to 100 g, per 100 kilogram of plant propagation material (preferably seed) are generally required.

When used in the protection of materials or stored products, the amount of active substance applied depends on the kind of application area and on the desired effect. Amounts customarily applied in the protection of materials are 0.001 g to 2 kg, preferably 0.005 g to 1 kg, of active substance per cubic meter of treated material.

Various types of oils, wetters, adjuvants, fertilizer, or micronutrients, and other pesticides (e.g. herbicides, insecticides, fungicides, growth regulators, safeners) may be added to the active substances or the compositions comprising them as premix or, if appropriate not until immediately prior to use (tank mix). These agents can be admixed with the compositions according to the invention in a weight ratio of 1:100 to 100:1, preferably 1:10 to 10:1.

The user applies the composition according to the invention usually from a predosage device, a knapsack sprayer, a spray tank, a spray plane, or an irrigation system. Usually, the agrochemical composition is made up with water, buffer, and/or further auxiliaries to the desired application concentration and the ready-to-use spray liquor or the agrochemical composition according to the invention is thus obtained. Usually, 20 to 2000 liters, preferably 50 to 400 liters, of the ready-to-use spray liquor are applied per hectare of agricultural useful area.

The composition according to the invention may comprise from 0.1 to 40% by weight, preferably from 1 to 30 and in particular from 2 to 20% by weight of surface-active substances (as disclosed above), the amount of the hydroxyalkyl polyoxylene glycol ether of the invention not being taken into consideration.

The present invention furthermore relates to a method for controlling phytopathogenic fungi and/or undesirable vegetation and/or undesirable insect or mite infestation and/or for regulating the growth of plants, wherein the composition according to the invention is allowed to act on the respective pests, their environment or on the crop plants to be protected from the respective pests, on the soil and/or on undesired plants and/or on the crop plants and/or their environment.

Examples of suitable crop plants are cereals, for example wheat, rye, barley, triticale, oats or rice; beet, for example sugar or fodder beet; pome fruit, stone fruit and soft fruit, for example apples, pears, plums, peaches, almonds, cherries, strawberries, raspberries, currants or gooseberries; legumes, for example beans, lentils, peas, lucerne or soybeans; oil crops, for example oilseed rape, mustard, olives, sunflowers, coconut, cacao, castor beans, oil palm, peanuts or soybeans; cucurbits, for example pumpkins/squash, cucumbers or melons; fiber crops, for example cotton, flax, hemp or jute; citrus fruit, for example oranges, lemons, grapefruit or tangerines; vegetable plants, for example spinach, lettuce, asparagus, cabbages, carrots, onions, tomatoes, potatoes, pumpkin/squash or capsicums; plants of the laurel family, for example avocados, cinnamon or camphor; energy crops and industrial feedstock crops, for example maize, soybeans, wheat, oilseed rape, sugar cane or oil palm; tobacco; nuts; coffee; tea; bananas; wine (dessert grapes and grapes for vinification); hops; grass, for example turf; sweetleaf (*Stevia rebaudania*); rubber plants and forest plants, for example flowers, shrubs, deciduous trees and coniferous trees, and propagation material, for example seeds, and harvested products of these plants.

The term crop plants also includes those plants which have been modified by breeding, mutagenesis or recombinant methods, including the biotechnological agricultural products which are on the market or in the process of being developed. Genetically modified plants are plants whose genetic material has been modified in a manner which does not occur under natural conditions by hybridizing, mutations or natural recombination (i.e. recombination of the genetic material). Here, one or more genes will, as a rule, be integrated into the genetic material of the plant in order to improve the plant's properties. Such recombinant modifications also comprise posttranslational modifications of proteins, oligo- or polypeptides, for example by means of glycosylation or binding of polymers such as, for example, prenylated, acetylated or farnesylated residues or PEG residues.

Examples which may be mentioned are plants which, as the result of plant-breeding and recombinant measures, have acquired a tolerance for certain classes of herbicides, such as hydroxyphenylpyruvate dioxygenase (HPPD) inhibitors, acetolactate synthase (ALS) inhibitors such as, for example, sulfonylureas (EP-A 257 993, U.S. Pat. No. 5,013,659) or imidazolinones (for example U.S. Pat. No. 6,222,100, WO 01/82685, WO 00/26390, WO 97/41218, WO 98/02526, WO 98/02527, WO 04/106529, WO 05/20673, WO 03/14357, WO 03/13225, WO 03/14356, WO 04/16073), enolpyruvylshikimate 3-phosphate synthase (EPSPS) inhibitors such as, for example, glyphosate (see, for example, WO 92/00377), glutamine synthetase (GS) inhibitors such as, for example, glufosinate (see, for example, EP-A 242 236, EP-A 242 246) or oxynil herbicides (see, for example, U.S. Pat. No. 5,559,024). For example, breeding and mutagenesis have given rise to Clearfield® oilseed rape (BASF SE, Germany), which features tolerance for imidazolinones, for example imazamox. With the aid of recombinant methods, crop plants such as soybeans, cotton, maize, beet and oilseed rape have been generated which are resistant to glyphosate or glufosinate, and these are available by the brand names RoundupReady® (glyphosate-resistant, Monsanto, U.S.A.) and Liberty Link® (glufosinate-resistant, Bayer CropScience, Germany).

The preparation of hydroxyalkyl polyoxylene glycol ethers is generally known. They are usually produced by reacting fatty alcohols with alkoxylated branched alkyloxiranes in the presence of alkaline catalysts. The production processes are known per se and are also disclosed in EP 0 299 360 A2.

The present invention furthermore relates to a method of preparing the composition according to the invention by bringing the pesticide and the hydroxyalkyl polyoxylene glycol ether of the general formula (I) into contact, e.g. by mixing. The contacting may be done between 5 to 95° C. Thus, a tankmix or an agrochemical composition may be prepared.

The present invention also relates to the use of the hydroxyalkyl polyoxylene glycol ether of the present invention as disclosed above as adjuvants in pesticide-comprising spray mixtures. The adjuvant is preferably an activity-enhancing adjuvant. They enhance or accelerate the activity of pesticides in comparison with the activity of the pesticide in the absence of the adjuvant.

The present invention also relates to a method of improving the activity of one or more pesticides comprising the step of mixing an effective amount of hydroxyalkyl polyoxylene glycol ether of the present invention with one or more pesticides described in the present disclosure.

The advantages of the invention are the ability of the hydroxyalkyl polyoxylene glycol ether of the present invention to enhance the activity of pesticides; to enhance the yield; to enhance uptake of the pesticide into the plants; to lower the surface tension of the formulation.

The examples which follow illustrate the invention without imposing any limitation.

EXAMPLES

Material and Methods

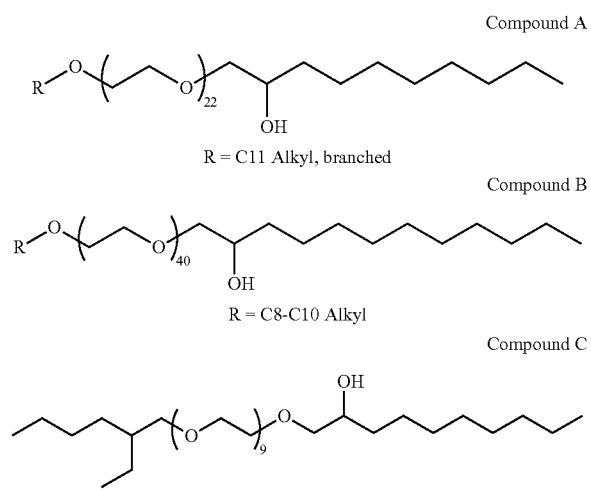

Compound A

R = C11 Alkyl, branched

Compound B

R = C8-C10 Alkyl

Compound C

Example 1—Synthesis of Hydroxyalkyl Polyoxylene Glycol Ether a) Production of Compound C 130.23 g isooctanol and 1.3 g of sodium methylate 30% in methanol were charged to a autoclave. At 80-100° C. the alcoholate of isooctanol was formed and methanol was removed by vacuum distillation at 50-100 mbar. The vacuum was then removed by feeding nitrogen. Additionally the autoclave was purged with nitrogen for two times before rising the temperature to 150-160° C. and feeding 396 g of ethylene oxide at a maximum temperature of 160-180° C. and at a maximum pressure of 5 bars. After complete addition of ethylene oxide the reaction mixture was stirred for additional 30 min at 160-180° C. Then the product was cooled to 80° C. In a second step of the reaction an additional amount of catalyst was added, preferably 3.5 g KOH and feed 156 g 1,2-deceneoxide under nitrogen at a temperature of 160-180° C. over a period of approx. 2 h. After completion of the reaction, the product was cooled to 80° C. and was neutralized.

b) Production of Compounds A and B

A similar procedure can be applied for the production of Compound A and Compound B, starting with different branched or linear fatty alcohols, different amounts of ethylene oxide and different 1,2-olefin epoxides.

Example 2—Field Trials

Field studies were conducted on a Parabraunerde soil in accordance with GEP in southern Germany on commercially planted winter wheat (var. Akteur) and winter rapeseed (var. Genie), respectively, exposed to a maritime climate. The standard experimental design was a randomized complete block with 4 replicates. There was no artificial infestation. Fungicides were applied at their label rate (N) and when mixed with adjuvants in the tank, at half rate (N/2). Dose rate of adjuvants was 150 ml/ha. Efficacy was measured by yield in dt/ha. Following the analysis of variance a mean separation test (Student-Newman-Keuls) was applied at a 5% significance level. All treatments were fully selective.

Winter Wheat

Spray volume was 200 l/ha applied with an AirMix 110-03 nozzle at a pressure of 1.9 bar. Plots were in 2.5 m by 7 m large. Epoxiconazole SC 125 with a dispersing additive (based on naphthalene sulfonic acid formaldehyde condensation product, sodium salt) was applied twice at the growth stages (BBCH) 32 and 51. During the course of trial, there was a natural infestation of Septoria and Brown rust. In each treatment, the dose rate of adjuvants was 150 ml/ha.

Rapeseed

Spray volume was 250 l/ha applied with an AirMix 110-03 nozzle at a pressure of 2.1 bar. Plots were in 3 m by 7 m large. Cantus® Gold SC (200 g/l Boscalid and 200 g/l Dimoxystrobin with a dispersing additive based on benzenesulfonic acid, hydroxy-, polymer with formaldehyde, phenol and urea, sodium salt) was applied at the growth stage (BBCH) 51 of rapeseed on a Parabraunerde soil. During the course of trial, there was a natural infestation of *Sclerotinia* sp. In each treatment, the dose rate of adjuvants was 150 ml/ha.

Results

For a quantitative measure, the yield of each treatment was determined.

TABLE 1

| Yield Winter Wheat | |
|---|---|
| | Relative Yield (%) |
| —[a] | 100.0 |
| N/2 (half rate epoxiconazole) | 103.5 |
| N/2 + Compound A | 108.7 |
| N/2 + Compound B | 107.7 |
| N/2 + Compound C | 109.4 |

[a] Comparative experiment, not inventive, without adjuvant.

TABLE 2

Yield Rapeseed

| | Relative Yield (%) |
|---|---|
| —[a] | 100.0 |
| N/2 (half rate Cantus ® Gold SC) | 103.1 |
| N/2 + Compound A | 107.1 |
| N/2 + Compound B | 103.5 |
| N/2 + Compound C | 104.6 |

[a] Comparative experiment, not inventive, without adjuvant.

In both trials, compound A gave significant improvements of the half rate (N/2) compared to N/2 alone. Compound C and compound B gave best effect on wheat with significant improvements of the half rate (N/2) compared to N/2 alone. The differences were statistically significant.

Example 3—Synthesis

The hydroxyalkyl polyoxylene glycol ether compounds 1-7 of the general formula (II)

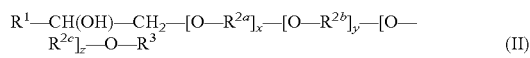

$$R^1—CH(OH)—CH_2—[O—R^{2a}]_x—[O—R^{2b}]_y—[O—R^{2c}]_z—O—R^3 \quad (II)$$

with the residues as defined in Table 3 were synthesized by reacting alcohols $R^3$—OH with ethylene oxide and/or propyleneoxide in the presence of alkaline catalysts, and subsequently reacting the alkoxylated alcohols with 1,2-deceneoxide in the presence of KOH.

TABLE 3

| Compound | $R^1$ | $R^{2a}$ (x) | $R^{2b}$ (y) | $R^{2c}$ (z) | $R^3$ |
|---|---|---|---|---|---|
| 1 | octyl | propylene (1,5) | ethylene (16) | (0) | $C_{12/14}$-alkyl |
| 2 | octyl | ethylene (14) | propylene (1) | (0) | $C_{12/14}$-alkyl |
| 3 | octyl | propylene (3) | ethylene (16) | (0) | $C_{12/14}$-alkyl |
| 4 | octyl | ethylene (8) | propylene (3) | ethylene (8) | $C_{12/14}$-alkyl |
| 5 | octyl | propylene (3) | ethylene (14) | (0) | $C_{11}$-alkyl [a] |
| 6 | octyl | ethylene (2) | (0) | (0) | 2-ethylhexyl |
| 7 | octyl | ethylene (5) | (0) | (0) | 2-propylheptyl |

[a] Mix of linear and branched alkyl

Example 4—Increased Uptake Rate

Wheat plants (*Triticum aestivum* variety Melon) were cultivated in the greenhouse for 6 weeks up to development stage BBCH 39. The plants were transferred to an automatic lab track sprayer and they were sprayed with 125 g/ha epoxiconazole, 125 g/ha fluxapyroxad, and 250 g/ha of the respective Compound 1-5 according to the following parameters:

Water amount: 200 l/ha
Nozzle type: Air injector, ID 120 02 (Lechler, Germany)
Speed: 1.4 m/s
Pressure: 3.33 bar Subsequently to spraying, the plants were cultivated again in the greenhouse under ambient conditions. After 8 days samples of 10-15 treated leaves were cut off and weighed.

Leaves were cut into small pieces, transferred into glass bottles and washed with 50% methanol in demineralized water as washing medium for 5 min. Then, the washing medium was separated from the leaves. The leaves were washed again with washing medium for 5 min. Both washing media were combined and diluted for analysis.

Finally, the leaves were transferred to a vial containing the extraction medium (75% methanol, 20% water and 5% HCl) and homogenized using a Polytron PT 6100 dispersing unit (Kinematica, CH) for 2 min. 10 ml of the extract were centrifuged with 4000 rpm for 5 min. 2 ml of the supernatant were treated with 2 ml NaOH (0.2 mol/L) and 5 ml cyclohexane, and stirred for 30 min and centrifuged subsequently. 1 ml of the cyclohexane phase was transferred to a glass vial and dried (Liebisch N2 Evaporator, Germany). The residue was solubilized in methanol/water 50:50 and analyzed by HPLC-MS/MS.

An Agilent 1100 series HPLC coupled to an Applied Biosystems API 3000 triple quadrupole mass spectrometer, equipped with an electro spray ionization source, was used. The mass spectrometer was operated in the MS/MS positive ion mode with multiple reaction monitoring (MRM) using two transitions per analyte at optimized conditions. In addition, unsprayed plants were treated in the same way to see whether they are contaminated. Unsprayed leaves were spiked with standard active ingredient to determine the recovery of active ingredient during washing and extracting steps. According to the recovery rate the measured sample values were corrected. The results were summarized in Table 4.

For comparison, the plants were sprayed without the Compounds 1-5.

The data showed that the uptake rate of epoxiconazol and fluxapyroxad were increased when using the Compounds 1-5 according to the invention.

TABLE 4

Uptake rate

| Compound | Epoxiconazole Uptake Rate [%] | Fluxapyroxad Uptake Rate [%] |
|---|---|---|
| —[a] | 19 | 16 |
| 1 | 43 | 30 |
| 2 | 41 | 27 |
| 3 | 41 | 29 |
| 4 | 40 | 27 |
| 5 | 39 | 27 |

[a] comparative example without any adjuvant

Example 5—Increased Biological Activity

The biological activity was assessed in a greenhouse on wheat (species "Kanzler"), which was infected with *Puccinia triticina* at two leafes stage and incubated for three days at high humidity. The plants were sprayed (spray volume 200 l/ha) with a composition comprising 50 ppm (10 g/ha or 2.5 g/ha dose rate) epoxiconazole and 100 ppm (20 g/ha) of the respective Compounds 1-7. In the comparative example no adjuvant was added. The plants were further cultivated for ten days at 20-24° C. and 60-90% relative humidity. Finally, the percentage of the infected leaf area (pustules) was visually inspected. Each value was based on three replicates. The results are summarized in Table 5.

TABLE 5

| Compound | Infected leaf area 10 g/ha dose rate | Infected leaf area 2,5 g/ha dose rate |
|---|---|---|
| —[a] | 48 | 78 |
| 1 | 4 | 13 |
| 2 | 4 | 17 |
| 3 | 4 | 12 |
| 4 | 6 | 16 |
| 5 | 5 | 23 |

TABLE 5-continued

| Compound | Infected leaf area 10 g/ha dose rate | Infected leaf area 2,5 g/ha dose rate |
|---|---|---|
| 6 | 12 | 23 |
| 7 | 7 | 25 |

[a]) comparative example without adjuvant

Example 6—Surface Tension

Physical measurements were done with a solution or dispersion of 1 g/l of the samples from Compounds 1-7 in deionized water. The static or equilibrium surface tension is a characteristic value of the interfacial activity of a formulation in the spray solution. Below the critical micelle concentration (CMC) the static surface tension depends on the concentration of the surface active ingredients in the formulation, whereas above the CMC the static surface tension stays constant. The measurement was carried out with the process tensiometer Kruess K 100 using the Wilhelmy-Plate-Method. During the measurement the bottom line of a vertical hanging platinum plate is wetted by the liquid to be analyzed. The force with which the plate is pulled into the liquid is measured and can be converted into the surface tension of the liquid in mN/m. 40 mL of the prepared spray solution are filled into Teflon troughs in the apparatus and the surface tension is detected. The static surface tension is calculated once five successive measuring points match within 0.1 mN/m. The results are summarized in Table 6.

TABLE 6

| Compound | Surface Tension [mN/m] |
|---|---|
| 1 | 29 |
| 2 | 29 |
| 3 | 29 |
| 4 | 30 |
| 5 | 29 |
| 6 | 28 |
| 7 | 27 |

Example 7—Solubility

In order to determine the solubility samples of Compounds 1-7 were stirred in Solvesso® 200 from ExxonnMobil (an aromatic hydrocarbon solvent, initial boiling point about 230° C.), or in Agnique® AMD10 (N,N-dimethyl decanamide) at room temperature and visually inspected.

TABLE 7

| Compound | Soluble in Solvesso ® 200 at 50 wt % | Soluble in Agnique ® AMD10 at 25 wt % |
|---|---|---|
| 1 | YES | YES |
| 2 | YES | YES |
| 3 | YES | YES |
| 4 | YES | YES |
| 5 | YES | YES |
| 6 | YES | YES |
| 7 | YES | YES |

We claim:

1. A composition comprising a pesticide and a hydroxyalkyl polyoxylene glycol ether of the general formula (I)

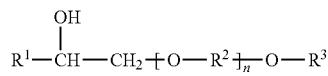

(I)

where
$R^1$ is a saturated or unsaturated, linear or branched alkyl having 6 to 18 carbon atoms;
$R^2$ is ethylene, propylene, butylene or a mixture thereof;
$R^3$ is a saturated or unsaturated, linear or branched alkyl having 6 to 18 carbon atoms; and
n has a value of from 1 to 100;
wherein the pesticide is a fungicide; and
wherein the hydroxyalkyl polyoxylene glycol ether of the general formula (I) enhances the activity of the fungicide.

2. The composition according to claim 1, wherein the hydroxyalkyl polyoxylene glycol ether is of the general formula (II)

$$R^1\text{—CH(OH)}\text{—CH}_2\text{—}[O\text{—}R^{2a}]_x\text{—}[O\text{—}R^{2b}]_y\text{—}[O\text{—}R^{2c}]_z\text{—}O\text{—}R^3 \quad (II)$$

where
$R^1$ and $R^3$ are as defined in claim 1;
$R^{2a}$, $R^{2b}$ and $R^{2c}$ are independently ethylene, propylene, or butylene;
x, y and z are independently a value from 0 to 100; and
x, y and z sum up to a value of from 1 to 100.

3. The composition according to claim 2, wherein $R^{2a}$, $R^{2b}$ and $R^{2c}$ are independently ethylene or propylene.

4. The composition according to claim 2, wherein x, y and z sum up to a value of from 3 to 50.

5. The composition according to claim 1, wherein $R^1$ is a saturated or unsaturated, linear or branched alkyl having 8 to 14 carbon atoms.

6. The composition according to claim 1, wherein $R^1$ is a saturated linear alkyl having 8 to 12 carbon atoms.

7. The composition according to claim 1, wherein $R^2$ is ethylene or a mixture of ethylene and propylene.

8. The composition according to claim 1, wherein $R^2$ is ethylene.

9. The composition according to claim 1, wherein $R^3$ is a saturated or unsaturated, linear or branched alkyl having 8 to 12 carbon atoms.

10. The composition according to claim 1, wherein $R^3$ is a saturated branched alkyl having 8 to 12 carbon atoms.

11. The composition according to claim 1, wherein n has a value of from 3 to 50.

12. The composition according to claim 1, wherein the fungicide is selected from the group consisting of carboxamides, triazoles, pyrazole-4-carboxamides and strobilurins.

13. The composition according to claim 1 wherein the weight percent ratio of fungicide to hydroxyalkyl polyoxylene glycol ether is from 1:30 to 25:1.

14. A method of preparing the composition as defined in claim 1, the method comprising bringing the pesticide and the hydroxyalkyl polyoxylene glycol ether of the general formula (I) into contact.

15. A method for controlling phytopathogenic fungi, the method comprising applying the composition as defined in claim 1 on the phytopathogenic fungi, on their environment, on crop plants to be protected from the phytopathogenic fungi, on soil, or combinations thereof.

16. A seed comprising the composition as defined in claim 1.

17. A method of preparing a pesticide-comprising spray mixture, the method comprising bringing a fungicide and a hydroxyalkyl polyoxylene glycol ether as defined in claim 1 into contact.

18. A method for controlling undesirable vegetation, the method comprising applying the composition as defined in claim 1 on the undesirable vegetation, on its environment, on crop plants to be protected from the undesirable vegetation, on soil, or combinations thereof.

19. A method for controlling undesirable insect or mite infestation, the method comprising applying the composition as defined in claim 1 on the undesirable insects or mites, on their environment, on crop plants to be protected from the undesirable insect or mite infestation, on soil, or combinations thereof.

20. A method for regulating the growth of plants, the method comprising applying the composition as defined in claim 1 on the plants, on their environment, on soil, or combinations thereof.

\* \* \* \* \*